(12) United States Patent
Takato

(10) Patent No.: US 8,422,150 B2
(45) Date of Patent: Apr. 16, 2013

(54) OBJECTIVE OPTICAL SYSTEM

(75) Inventor: Hideyasu Takato, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/348,223

(22) Filed: Jan. 11, 2012

(65) Prior Publication Data
US 2012/0224268 A1 Sep. 6, 2012

Related U.S. Application Data

(63) Continuation of application No. PCT/JP2011/065076, filed on Jun. 30, 2011.

(30) Foreign Application Priority Data

Jul. 14, 2010 (JP) ................................. 2010-159747

(51) Int. Cl.
*G02B 13/04* (2006.01)
*G02B 13/18* (2006.01)
*G02B 9/34* (2006.01)

(52) U.S. Cl.
USPC ............ 359/753; 359/715; 359/781; 359/783

(58) Field of Classification Search .......... 359/749–753, 359/781, 783
See application file for complete search history.

(56) References Cited

U.S. PATENT DOCUMENTS

| 4,806,001 | A |   | 2/1989 | Okabe et al. |
| 5,005,957 | A | * | 4/1991 | Kanamori et al. ............ 359/708 |
| 5,087,989 | A | * | 2/1992 | Igarashi ........................ 359/692 |
| 5,119,238 | A |   | 6/1992 | Igarashi |

FOREIGN PATENT DOCUMENTS

| JP | 62-173415 A | 7/1987 |
| JP | 3-200911 A | 9/1991 |
| JP | 4-55807 | 2/1992 |
| JP | 10-20189 | 1/1998 |
| JP | 2004-145256 A | 5/2004 |
| JP | 2006-209028 | 8/2006 |
| JP | 2006-251272 | 9/2006 |
| JP | 2007-114546 | 5/2007 |
| JP | 2008-3108 | 1/2008 |
| JP | 2008-158198 | 7/2008 |
| JP | 2008-180887 | 8/2008 |
| JP | 2009-8867 | 1/2009 |

\* cited by examiner

*Primary Examiner* — Scott J Sugarman
(74) *Attorney, Agent, or Firm* — Scully Scott Murphy & Presser, PC

(57) ABSTRACT

An objective optical system including an objective optical system having a field angle of 140° or larger and including a front group, an aperture stop, and a positive rear group arranged in that order from an object side. The front group has at least one aspherical surface and includes a negative first lens disposed closest to the object side and satisfying the following conditional expression: $0 \leq r2/r1 < 0.24$, $0.1 < |g2/g1| < 2.2$ and $-1.8 < f1/fl < -0.8$, where r1 denotes the radius of curvature of the object side of the first lens, r2 denotes the radius of curvature of an image side of the first lens, g1 denotes the focal length of the front group, g2 denotes the focal length of the rear group, f1 denotes a focal length of the first lens, and fl denotes the focal length of the entire system.

4 Claims, 13 Drawing Sheets

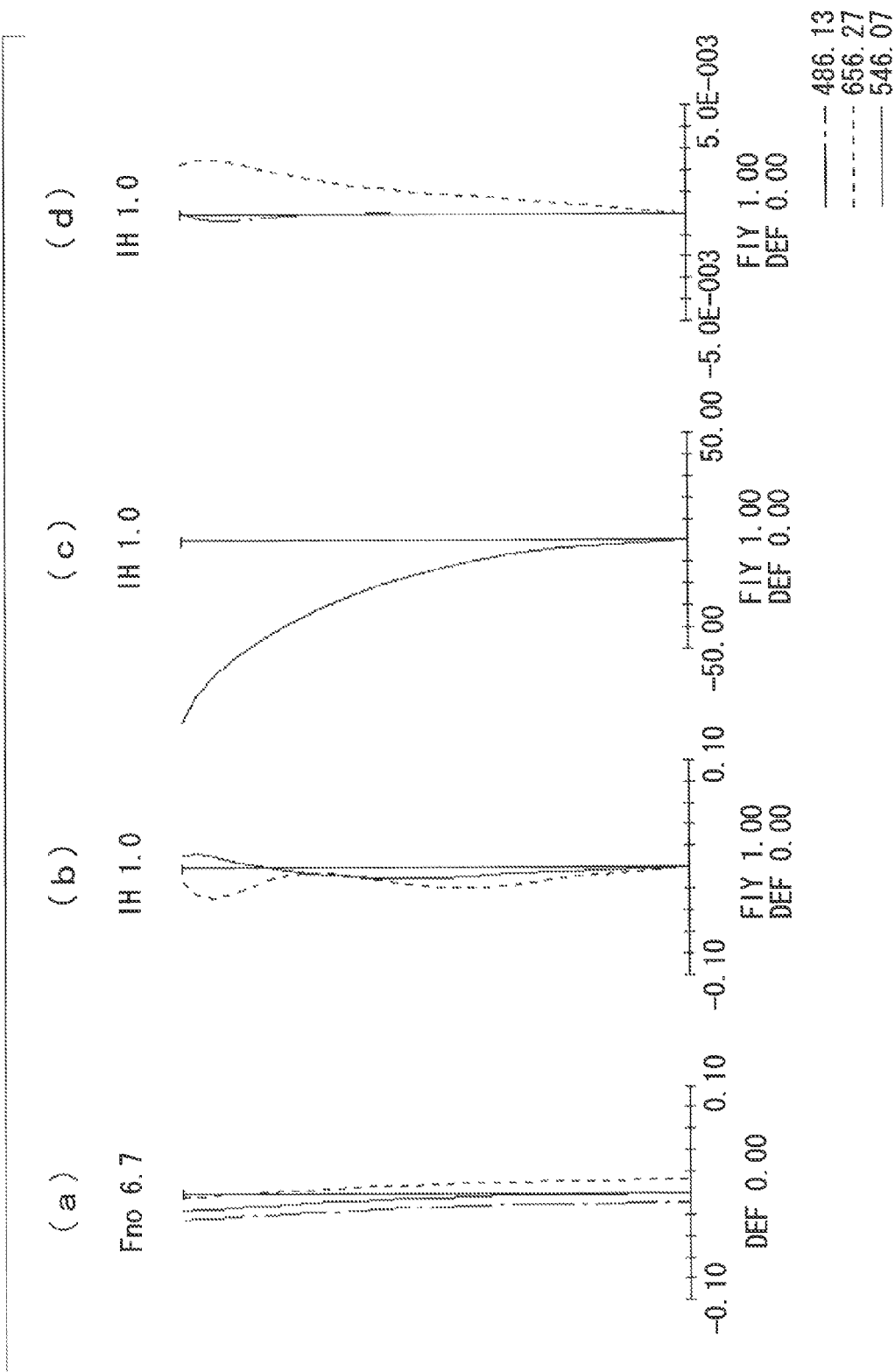

OBJECTIVE OPTICAL SYSTEM

CROSS REFERENCE TO RELATED APPLICATIONS

This is a continuation of International Application PCT/JP2011/065076, with an international filing date of Jun. 30, 2011, which is hereby incorporated by reference herein in its entirety. This application claims the benefit of Japanese Patent Application No. 2010-159747, the content of which is incorporated herein by reference.

TECHNICAL FIELD

The present invention mainly relates to objective optical systems for endoscopes, and to image-acquisition optical systems, such as consumer-oriented miniature cameras.

BACKGROUND ART

In the related art, a typical objective lens for an endoscope has a depth of view in a wide range of about 5 mm to 100 mm at an object side, instead of having a focusing function. The depth of view is a distance range between an object and an end surface of an objective optical system in which a clear image of the object can be acquired. An endoscope equipped with such an objective lens provides an image by mainly using a solid-state image acquisition element, such as a CCD. In recent years, in order to meet the demands for high-quality endoscopic images for improving diagnostic accuracy, high-resolution image acquisition elements, such as CCDs, have been developed.

If a high-resolution image acquisition element is used, the F number (Fno.) of the objective lens needs to be reduced so as to avoid image deterioration caused by diffraction, and the focal length of the objective lens needs to be increased in accordance with the increased size of the image acquisition element, resulting in a reduced depth of view of the objective lens. In order to ensure a depth of view as high as that in the related art, a known observation lens for an endoscope achieves a wide angle by reducing the focal length by using, for example, an aspherical lens.

SUMMARY OF INVENTION

Technical Problem

An objective lens for an endoscope discussed in both Japanese Unexamined Patent Application, Publication No. Hei 4-55807 and No. Hei 10-20189 is equipped with an aspherical lens so as to reduce the focal length while correcting distortion.

Japanese Unexamined Patent Application, Publication No. Hei 10-20189 discloses an optical system with a field angle over 160°. An objective lens for an endoscope discussed in Japanese Unexamined Patent Application, Publication No. 2006-251272 has a field angle of 150° or larger and uses a concave meniscus lens as a first lens so as to correct distortion.

An object of the present invention is to provide an objective optical system that is suitable for use with a high-resolution image acquisition element and that achieves correction of distortion and an increased depth of view while also achieving a wide field angle of 140° or larger.

Solution to Problem

The present invention provides an objective optical system having a field angle of 140° or larger and including a front group, an aperture stop, and a positive rear group arranged in order from an object side, the front group having at least one aspherical surface and including a negative first lens that is disposed closest to the object side and that satisfies the following conditional expression (1), (4), and (8):

$$0 \leq r2/r1 < 0.24 \quad (1)$$

$$0.1 < |g2/g1| < 2.2 \quad (4)$$

$$-1.8 < f1/fl < -0.8 \quad (8)$$

where r1 denotes a radius of curvature of the object side of the first lens disposed closest to the object side in the front group, and r2 denotes a radius of curvature of an image side of the first lens, g1 denotes the focal length of the front group, g2 denotes the focal length of the rear group, f1 denotes a focal length of the first lens, and fl denotes the focal length of the entire system.

In order to achieve a wide-angle objective optical system, it is necessary to provide a front group having a negative first lens, an aperture stop, and a positive rear group in that order from the object side. In order to ensure a sufficient depth of view, a field angle of 140° or larger is required. If the field angle is 140° or smaller, the depth of view cannot be sufficiently increased since the focal length becomes larger.

Furthermore, with the front group equipped with an aspherical lens, distortion can be corrected. In an optical system of a retro-focus type as in the present invention, large negative distortion tends to occur due to the negative first lens in the front group. By disposing an aspherical surface in the front group including the negative first lens, which is the source of the distortion generated, the distortion can be effectively corrected. Consequently, the focal length can be reduced even with the same field angle, whereby the depth of view can be increased more effectively.

Furthermore, in order to further exhibit the advantage of the wide-angle configuration, it is desirable that the front group have negative refractive power. In the present invention, the first lens is a negative lens. The ratio between the radius of curvature of opposite surfaces of the first lens is preferably within the range defined by conditional expression (1), (4), and (8).

In a case where the value falls below the lower limit of conditional expression (1), since an object-facing surface of the first lens exposed at an outer surface of an endoscope is a concave surface in this case, the problem of poor draining of water during observation occurs, which is not desirable. On the other hand, in a case where the value exceeds the upper limit of conditional expression (1), since the radius of curvature of the object-facing surface of the first lens is reduced, the amount of protrusion of the lens from the tip of the endoscope increases, which may cause problems, such as formation of scratches on the first lens. Moreover, this is not desirable due to the poor water drainage. In addition, the negative power of the first lens becomes weaker, leading to an increase in the lens diameter thereof, which is not desirable.

If the value falls below the lower limit of conditional expression (4), the focal length of the front group becomes relatively larger so that the image surface falls toward the positive side. On the other hand, if the value exceeds the upper limit of conditional expression (4), the focal length of the rear group becomes larger so that the image surface falls toward the negative side.

If the value falls below the lower limit of conditional expression (8), the negative power of the first lens decreases, leading to an increase in the lens diameter thereof, making the first lens unsuitable for use in an endoscope, which has a narrow tip. On the other hand, if the value exceeds the upper limit of conditional expression (8), it becomes difficult to ensure a back-focus function since the negative power of the first lens increases, making it difficult to adjust the focal point.

In the above aspect of the invention, it is preferable that the following conditional expression (2) be satisfied:

$$0.65 < f1/IH < 0.82 \qquad (2)$$

where f1 denotes a focal length of the entire system, and IH denotes a maximum image height.

In a case where the value falls below the lower limit of conditional expression (2), a sufficient depth of view can be obtained since the focal length is reduced relative to the field angle. However, the magnification at the center becomes too low relative to the magnification of a peripheral region of an image, making observation difficult. On the other hand, in a case where the value exceeds the upper limit of conditional expression (2), since the focal length increases, the advantage of the increased depth of view is reduced, which is not desirable. In the above aspect of the invention, it is more preferable that the following conditional expression (2)' be satisfied:

$$0.68 < f1/IH < 0.78 \qquad (2)'$$

In the above aspect of the invention, it is preferable that the front group include the first lens and a positive second lens arranged in order from the object side.

In order to correct transverse chromatic aberration that occurs in the front group, a negative first lens and a positive second lens are required. Moreover, the front group may be constituted of the negative first lens and a joined lens that is formed by joining the positive second lens to a negative lens. Thus, the correction effect of transverse chromatic aberration can be further improved. Especially in an objective optical system that can be used with a high-resolution image acquisition element as in the present invention, since insufficient correction of transverse chromatic aberration may possibly cause color bleeding in addition to reduced resolution in the peripheral region of the image, it is important to correct transverse chromatic aberration.

In the above configuration, it is preferable that the first lens and the second lens satisfy the following conditional expression (3):

$$-0.66 < f1/f2 < -0.06 \qquad (3)$$

where f1 denotes a focal length of the first lens, and f2 denotes a focal length of the second lens.

In a case where the value falls below conditional expression (3), the focal length of the first lens increases, resulting in weaker negative refractive power. This results in a loss of the retro-focus function and makes it difficult to achieve a wide-angle configuration, which is not desirable. On the other hand, in a case where the value exceeds conditional expression (3), the focal length of the second lens increases, making it difficult to correct the aforementioned transverse chromatic aberration, which is not desirable.

Advantageous Effects of Invention

BRIEF DESCRIPTION OF DRAWINGS

FIG. 13 illustrates aberration diagrams of the objective optical system in FIG. 12.

DESCRIPTION OF EMBODIMENTS

An objective optical system 1 according to an embodiment of the present invention will be described below with reference to FIG. 1.

Figure 1:
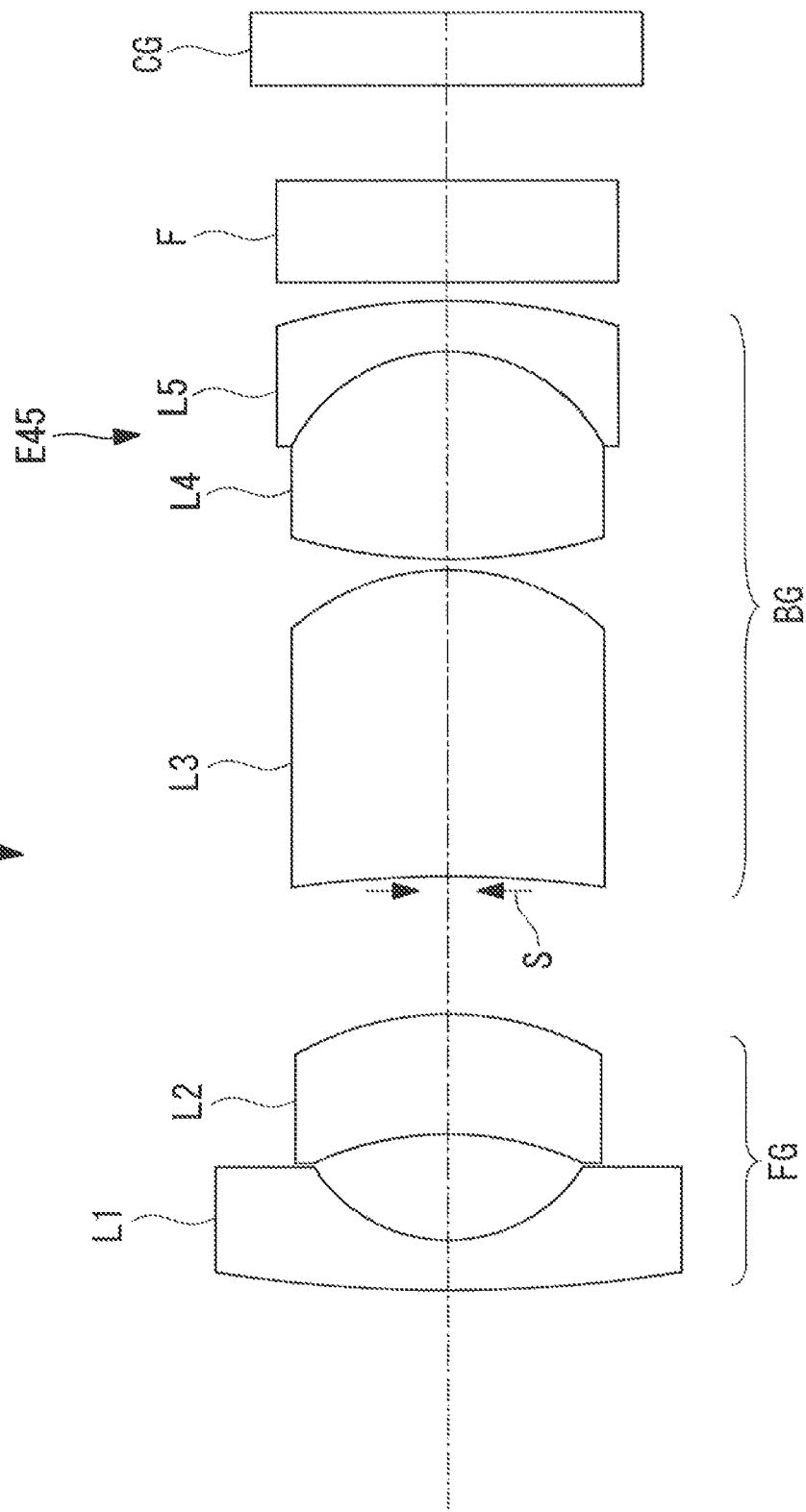
FIG. 1 illustrates the overall configuration of an objective optical system according to an embodiment of the present invention.

As shown in FIG. 1, the objective optical system 1 according to this embodiment includes a front group FG with negative refractive power, an aperture stop S, and a rear group BG with positive refractive power, which are arranged in that order from an object side, and has a field angle of 140° or larger. The front group FG includes a negative first lens L1 and a positive second lens L2 arranged in that order from the object side. The rear group BG includes a third positive lens L3 and a joined lens E45, which is formed of a positive lens L4 and a negative lens L5 that are joined together, which are arranged in that order from the object side.

A parallel flat plate F is disposed at an image side of the rear group BG. The parallel flat plate F is a filter for cutting light at specific wavelengths, for example, 1060 nm of a YAG laser, 810 nm of a semiconductor laser, or the near-infrared region. An image acquisition element (not shown) is disposed in the vicinity of an image surface and constitutes an image-acquisition optical system together with the objective optical system 1. A cover glass CG for protecting an image acquisition surface of the image acquisition element is attached thereto.

The front group FG has at least one aspherical surface in the first lens L1 and the second lens L2.

The first lens L1 satisfies the following conditional expression (1):

$$0 \leq r2/r1 < 0.24 \qquad (1)$$

where r1 denotes the radius of curvature of the object side of the first lens L1, and r2 denotes the radius of curvature of the image side of the first lens L1.

With the first lens L1 satisfying conditional expression (1), when the objective optical system 1 is fitted to an endoscope, an object-facing surface of the first lens L1 disposed at an end surface of the endoscope is a convex surface with appropriate curvature. Thus, water can be properly drained from the end surface of the endoscope, while the first lens L1 can be prevented from breaking. Moreover, by giving the first lens L1 sufficient negative refractive power, an increase in the outer diameter thereof can be prevented.

The objective optical system 1 satisfies the following conditional expression (2):

$$0.65 < f1/IH < 0.82 \qquad (2)$$

where fl denotes the focal length of the entire system, and IH denotes a maximum image height.

Accordingly, the focal length is appropriately set relative to the field angle so as to achieve a good balance between the magnification of a peripheral region of an image and the magnification of the center of the image, while also ensuring a sufficient depth of view.

The objective optical system 1 more preferably satisfies the following conditional expression (2)':

$$0.68 < fl/IH < 0.78 \quad (2)'$$

The first lens L1 and the second lens L2 satisfy the following conditional expression (3):

$$-0.66 < f1/f2 < -0.06 \quad (3)$$

where f1 denotes the focal length of the first lens L1, and f2 denotes the focal length of the second lens L2.

Accordingly, a wide-angle configuration and correction of transverse chromatic aberration can be achieved at the same time.

The objective optical system 1 satisfies the following conditional expression (4):

$$0.1 < |g2/g1| < 2.2 \quad (4)$$

where g1 denotes the focal length of the front group FG, and g2 denotes the focal length of the rear group BG.

Conditional expression (4) is for correcting field curvature. If the value falls below the lower limit of conditional expression (4), the image surface falls toward the positive side. On the other hand, if the value exceeds the upper limit of conditional expression (4), the focal length of the rear group BG becomes larger so that the image surface falls toward the negative side.

The objective optical system 1 satisfies the following conditional expression (5):

$$-0.66 < dtl \times 0.01/g2 \times IH < -0.38 \quad (5)$$

where dtl denotes distortion at the maximum image height.

If the value falls below the lower limit of conditional expression (5), a large amount of distortion occurs, causing the peripheral region of the image to become distorted, which is not desirable. On the other hand, if the value exceeds the upper limit of conditional expression (5), the amount of light in the peripheral region of the image is insufficient, causing the peripheral region of the image to become dark, which is not desirable.

The objective optical system 1 satisfies the following conditional expression (6):

$$66 < \omega < 88 \quad (6)$$

where $\omega$ denotes a half field angle at the maximum image height.

If the value falls below the lower limit of conditional expression (6), the focal length increases, making it difficult to achieve an increased depth of view. On the other hand, if the value exceeds the upper limit of conditional expression (6), an incident light beam undergoes total internal reflection, causing vignetting to readily occur at the four corners of the image, which is not desirable.

The objective optical system 1 more preferably satisfies the following conditional expression (6)'. This allows for a further increase in the depth of view.

$$78 < \omega < 88 \quad (6)'$$

The rear group BG satisfies the following conditional expression (7):

$$1.75 < g2/fl < 2.62 \quad (7)$$

The lenses in the rear group BG mainly contribute to image formation, and the back-focus becomes shorter with increasing power of the rear group BG. If the value falls below the lower limit of conditional expression (7), the power of the rear group BG becomes too strong, making it difficult to ensure a sufficient distance between the final lens L5 that performs focus adjustment and the image acquisition element. On the other hand, if the value exceeds the upper limit of conditional expression (7), the entire lens system increases in overall length and is thus not suitable for use in a miniature endoscope.

The first lens L1 satisfies the following conditional expression:

$$-1.8 < f1/fl < -0.8 \quad (8)$$

If the value falls below the lower limit of conditional expression (8), it makes the first lens L1 unsuitable for using in an endoscope, which has a narrow tip. On the other hand, if the value exceeds the upper limit of conditional expression (8), it becomes difficult to adjust the focal point.

According to this embodiment, since the front group FG is equipped with an aspherical lens, distortion can be effectively corrected, and a sufficient depth of view can be ensured even with a wide-angle configuration having a field angle of 140° or larger. Furthermore, by setting the focal lengths of the groups FG and BG to appropriate values, a compact image-acquisition optical system with no image deterioration can be formed by combining the objective optical system 1 with the image acquisition element. Moreover, since transverse chromatic aberration can be properly corrected, if the objective optical system 1 is combined with a high-resolution image acquisition element, a high-resolution image can be acquired at each object point.

In the above embodiment, the front group FG may alternatively be constituted of the first lens L1 and a joined lens that is formed by joining the second lens L2 to a negative lens (not shown). Thus, transverse chromatic aberration can be more properly corrected.

EXAMPLES

Next, first to sixth examples of the above embodiment will be described with reference to FIGS. 2 to 13.

In surface data described in this specification, a surface number denotes the number of an optical surface counted from the object side, and the refractive index and Abbe number denote values with respect to the e-line. In the surface data and various data, the radius of curvature, the distance between surfaces, the focal length, the image height, and the object-point distance are in units of millimeters.

An aspherical shape is defined by the following equation:

$$z=(y^2/r)/[1+\{1-(1+k)(y^2/r^2)\}^{1/2}]+A4y^4+A6y^6+A8y^8+A10y^{10}$$

In this case, z is defined as an optical-axis direction, and y is defined as a direction perpendicular to the optical axis. Moreover, k denotes a conical constant, r denotes the radius of curvature, and A4, A6, A8, and A10 denote aspherical coefficients.

In the appended cross-sectional views of the lenses, the reference characters r1, r2, r3, . . . denote optical surfaces with surface numbers 1, 2, 3, . . . . The reference characters d1, d2, d3, . . . denote spatial distances or distances between surfaces with the surface numbers 1, 2, 3, . . . . With regard to the appended aberration diagrams, diagram (a) illustrates spherical aberration, diagram (b) illustrates astigmatism, diagram (c) illustrates distortion, and diagram (d) illustrates transverse chromatic aberration.

First Example

Figure 2:
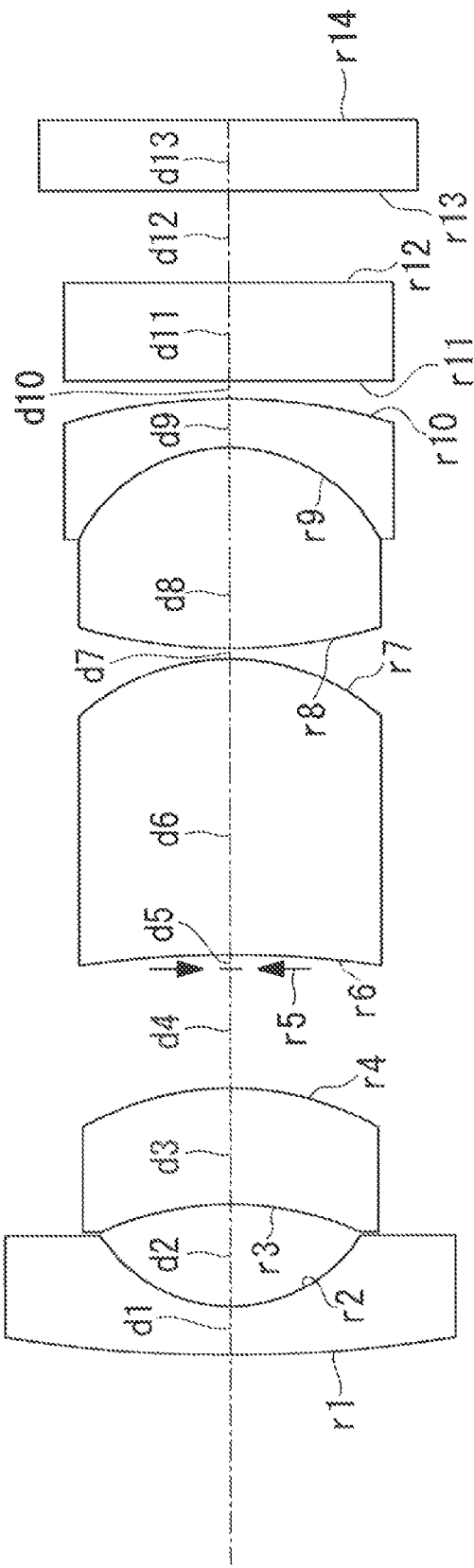
FIG. 2 is a cross-sectional view of an objective optical system according to a first example of the present invention.

A cross-sectional view of an objective optical system according to a first example is shown in FIG. 2, and surface data and various data thereof are shown below.

The objective optical system according to this example is constituted of a front group with negative refractive power, an aperture stop, and a rear group with positive refractive power, which are arranged in that order from the object side. The front group is constituted of a negative lens and a positive lens arranged in that order from the object side, and an image-facing surface of the negative lens is an aspherical surface. The rear group is constituted of a positive lens and a joined lens, which is formed of a positive lens and a negative lens that are joined together, which are arranged in that order from the object side.

Figure 3:
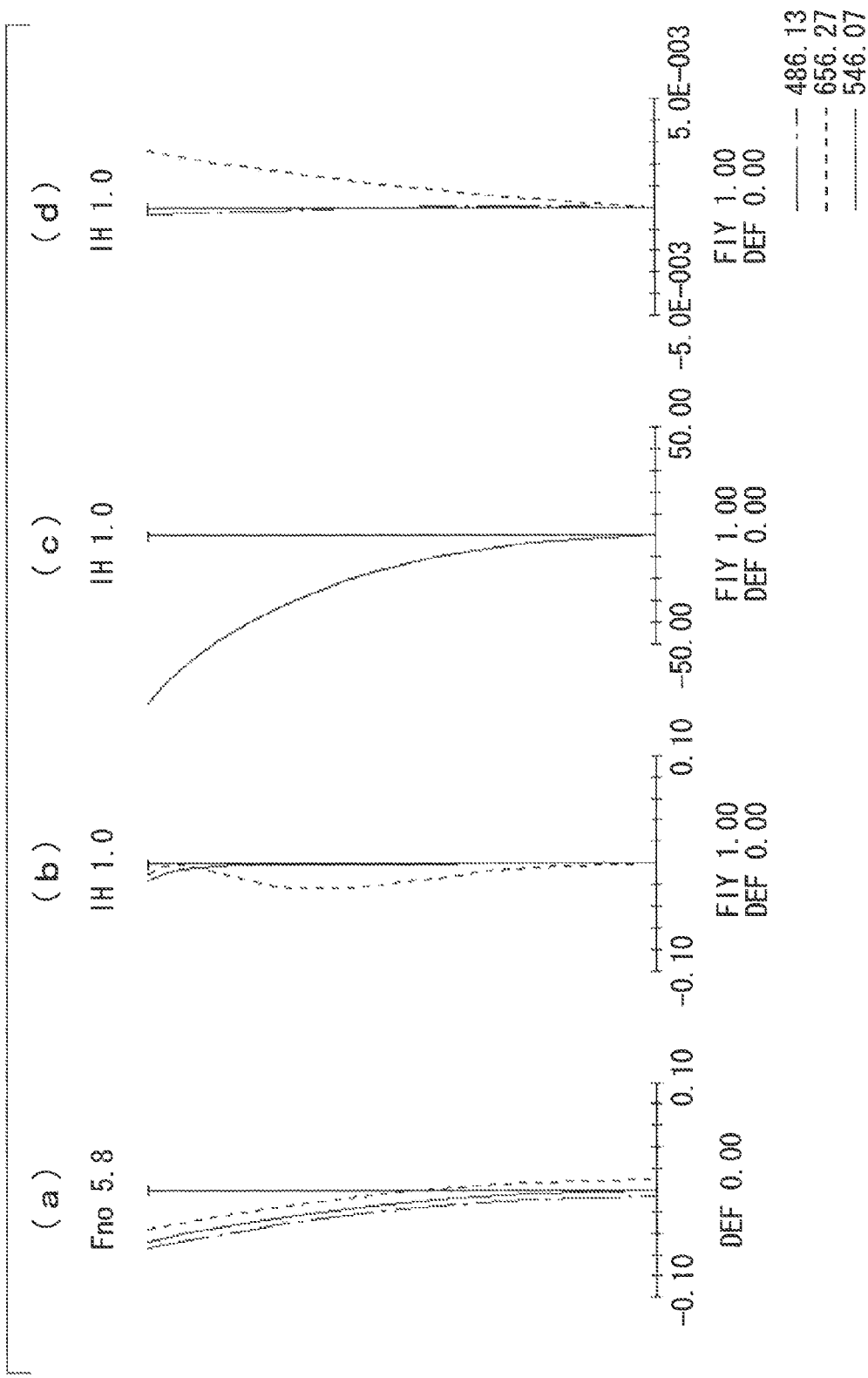
FIG. 3 illustrates aberration diagrams of the objective optical system in FIG. 2.

FIG. 3 illustrates aberration diagrams of the objective optical system according to the first example having the above-described configuration.

Surface Data

| Surface No. | Radius of Curvature | Distance Between Surfaces | Refractive Index | Abbe Number |
|---|---|---|---|---|
| 1 | 7.929 | 0.30 | 1.88815 | 40.8 |
| 2 | Aspherical | 0.62 | | |
| 3 | −1.925 | 0.70 | 1.85504 | 23.8 |
| 4 | −1.681 | 0.72 | | |
| 5 | Aperture Stop | 0.08 | | |
| 6 | −7.281 | 1.80 | 1.77621 | 49.6 |
| 7 | −1.336 | 0.07 | | |
| 8 | 3.202 | 1.22 | 1.51825 | 64.1 |
| 9 | −0.989 | 0.30 | 1.93429 | 18.9 |
| 10 | −3.090 | 0.10 | | |
| 11 | ∞ | 0.60 | 1.51965 | 75.0 |
| 12 | ∞ | 0.55 | | |
| 13 | ∞ | 0.40 | 1.51825 | 64.1 |
| 14 | Image Acquisition Surface | | | |

Aspherical Data
Second Surface $r = 0.878\ k = 0$
$A4 = -6.1805 \times 10^{-2}\ A6 = -9.1872 \times 10^{-2}$
$A8 = -1.5065 \times 10^{-5}\ A10 = -8.4911 \times 10^{-2}$ Various Data Focal Length: 0.71
Image Height IH: 1.0
Fno.: 5.77
Object-Point Distance: 4.8

Second Example

Figure 4:
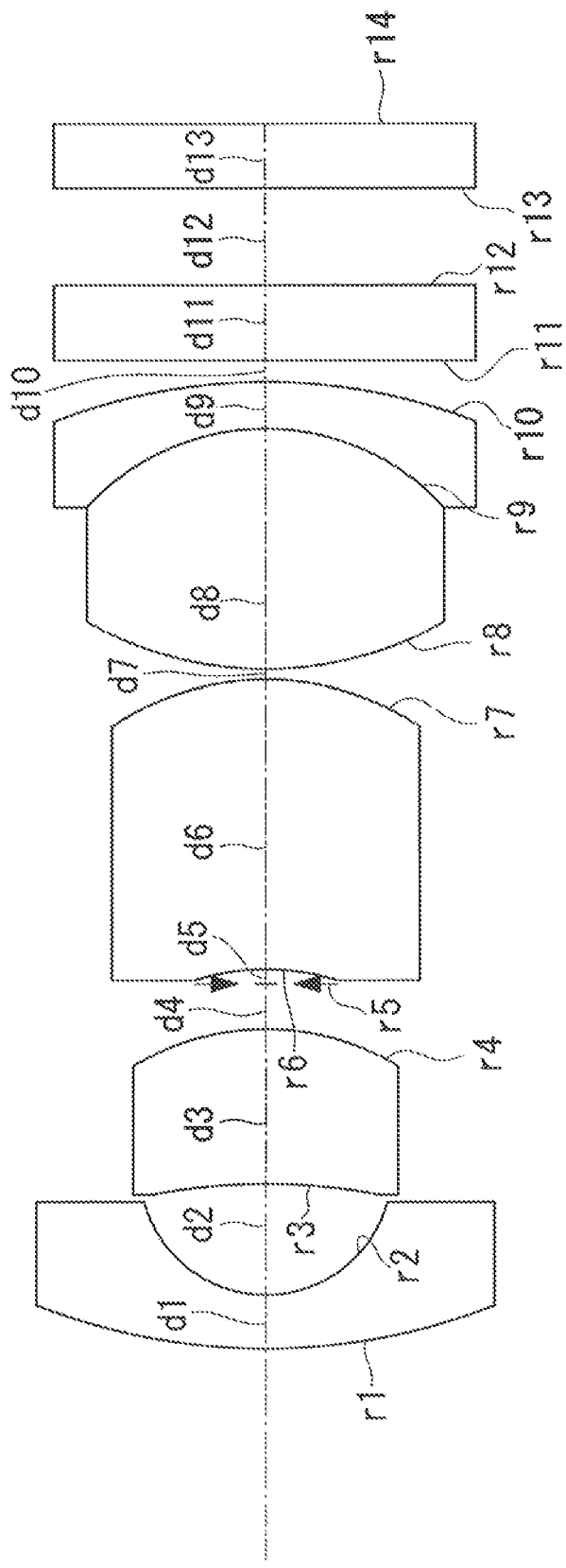
FIG. 4 is a cross-sectional view of an objective optical system according to a second example of the present invention.

A cross-sectional view of an objective optical system according to a second example is shown in FIG. 4, and surface data and various data thereof are shown below.

The objective optical system according to this example mainly differs from the objective optical system according to the first example in that the object-facing surface of the positive lens in the front group is an aspherical surface.

Figure 5:
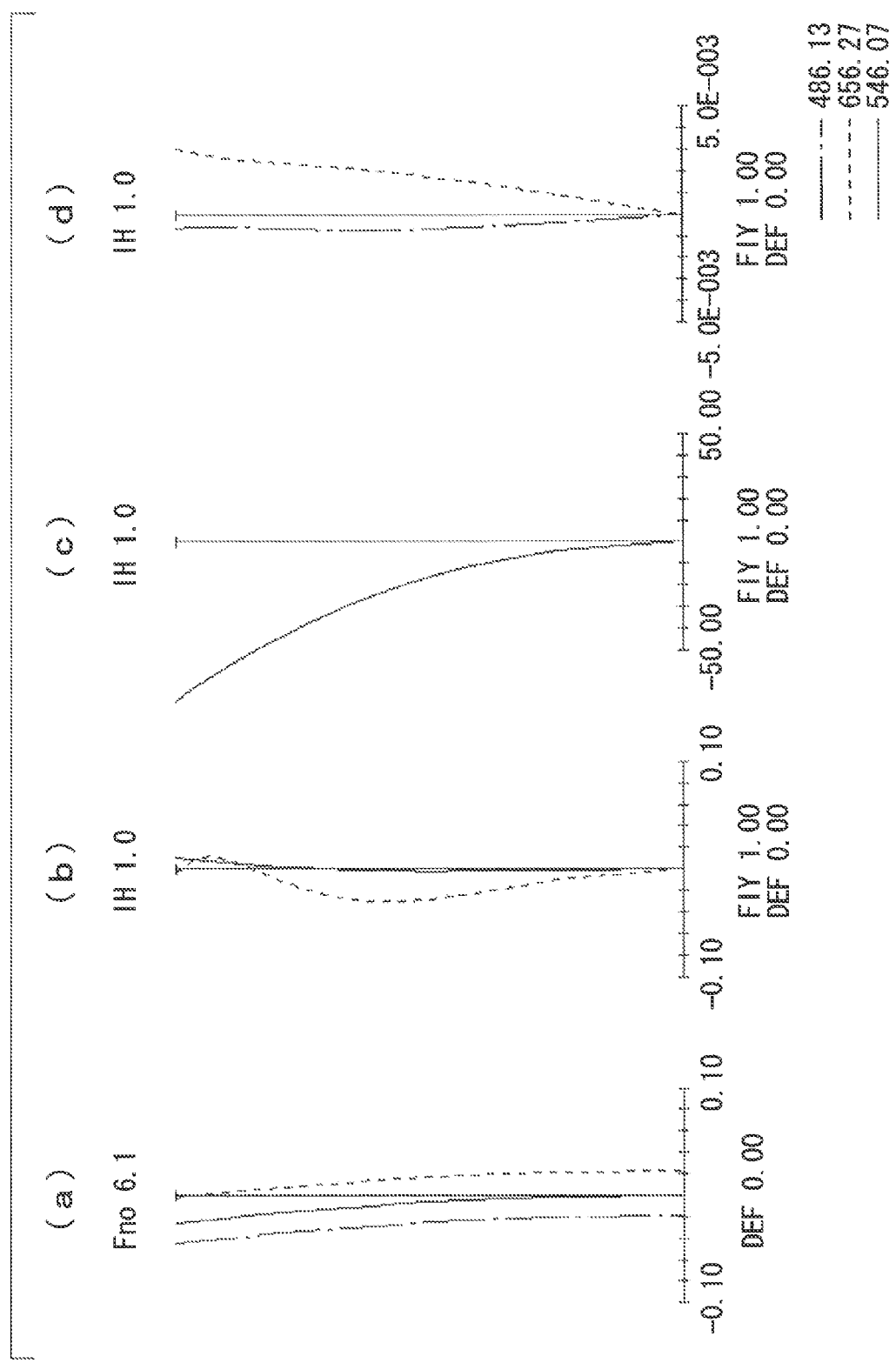
FIG. 5 illustrates aberration diagrams of the objective optical system in FIG. 4.

FIG. 5 illustrates aberration diagrams of the objective optical system according to the second example having the above-described configuration.

Surface Data

| Surface No. | Radius of Curvature | Distance Between Surfaces | Refractive Index | Abbe Number |
|---|---|---|---|---|
| 1 | 3.248 | 0.30 | 1.88815 | 40.8 |
| 2 | 0.682 | 0.65 | | |
| 3 | Aspherical | 0.95 | 1.85504 | 23.8 |
| 4 | −1.465 | 0.28 | | |
| 5 | Aperture Stop | 0.08 | | |
| 6 | −1.483 | 1.72 | 1.77621 | 49.6 |
| 7 | −1.384 | 0.07 | | |
| 8 | 1.994 | 1.44 | 1.51825 | 64.1 |
| 9 | −1.250 | 0.26 | 1.93429 | 18.9 |
| 10 | −3.583 | 0.12 | | |
| 11 | ∞ | 0.45 | 1.51965 | 75.0 |
| 12 | ∞ | 0.57 | | |
| 13 | ∞ | 0.40 | 1.51825 | 64.1 |
| 14 | Image Acquisition Surface | | | |

Aspherical Data
Third Surface $r = -4.349\ k = 0$
$A4 = 7.4645 \times 10^{-2}\ A6 = -2.2290 \times 10^{-1}$
$A8 = -1.8978 \times 10^{-4}\ A10 = 5.0581 \times 10^{-1}$ Various Data Focal Length: 0.70
Image Height IH: 1.0
Fno.: 6.12
Object-Point Distance: 5.0

Third Example

Figure 6:
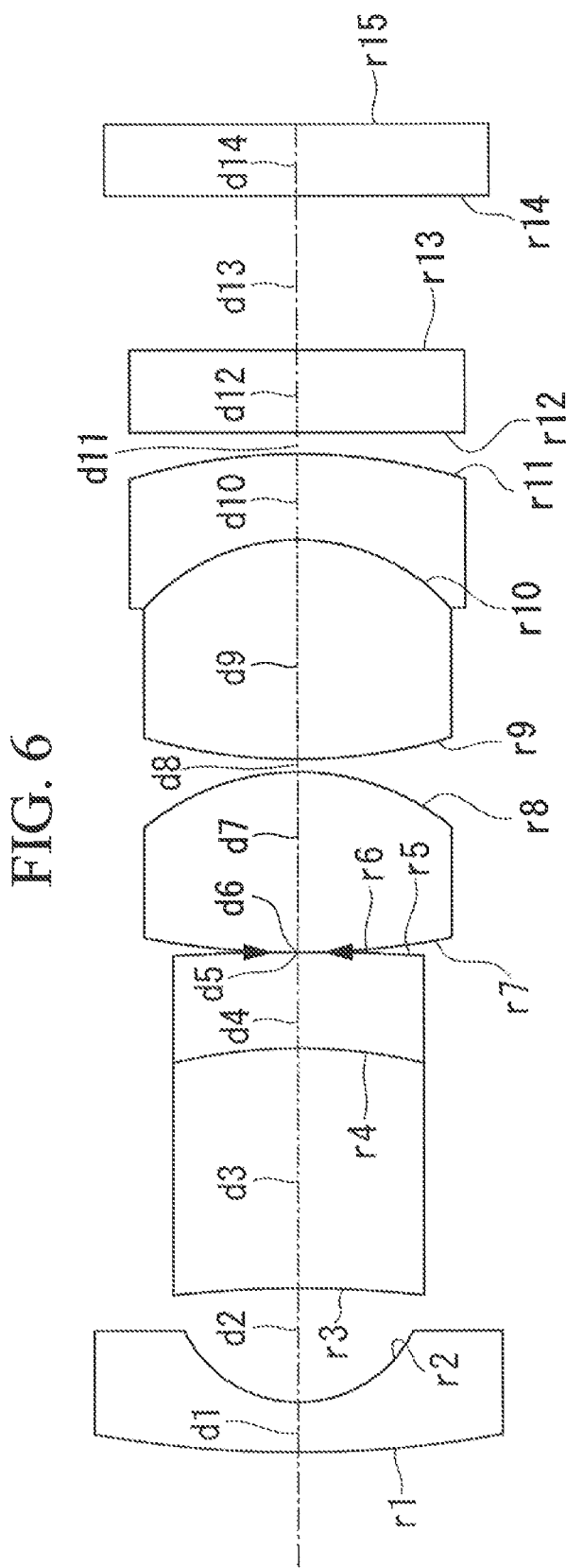
FIG. 6 is a cross-sectional view of an objective optical system according to a third example of the present invention.

A cross-sectional view of an objective optical system according to a third example is shown in FIG. 6, and surface data and various data thereof are shown below.

The objective optical system according to this example mainly differs from the objective optical system according to the first example in that the front group is constituted of a negative lens and a joined lens, which is formed of a positive lens and a negative lens that are joined together, which are arranged in that order from the object side.

Figure 7:
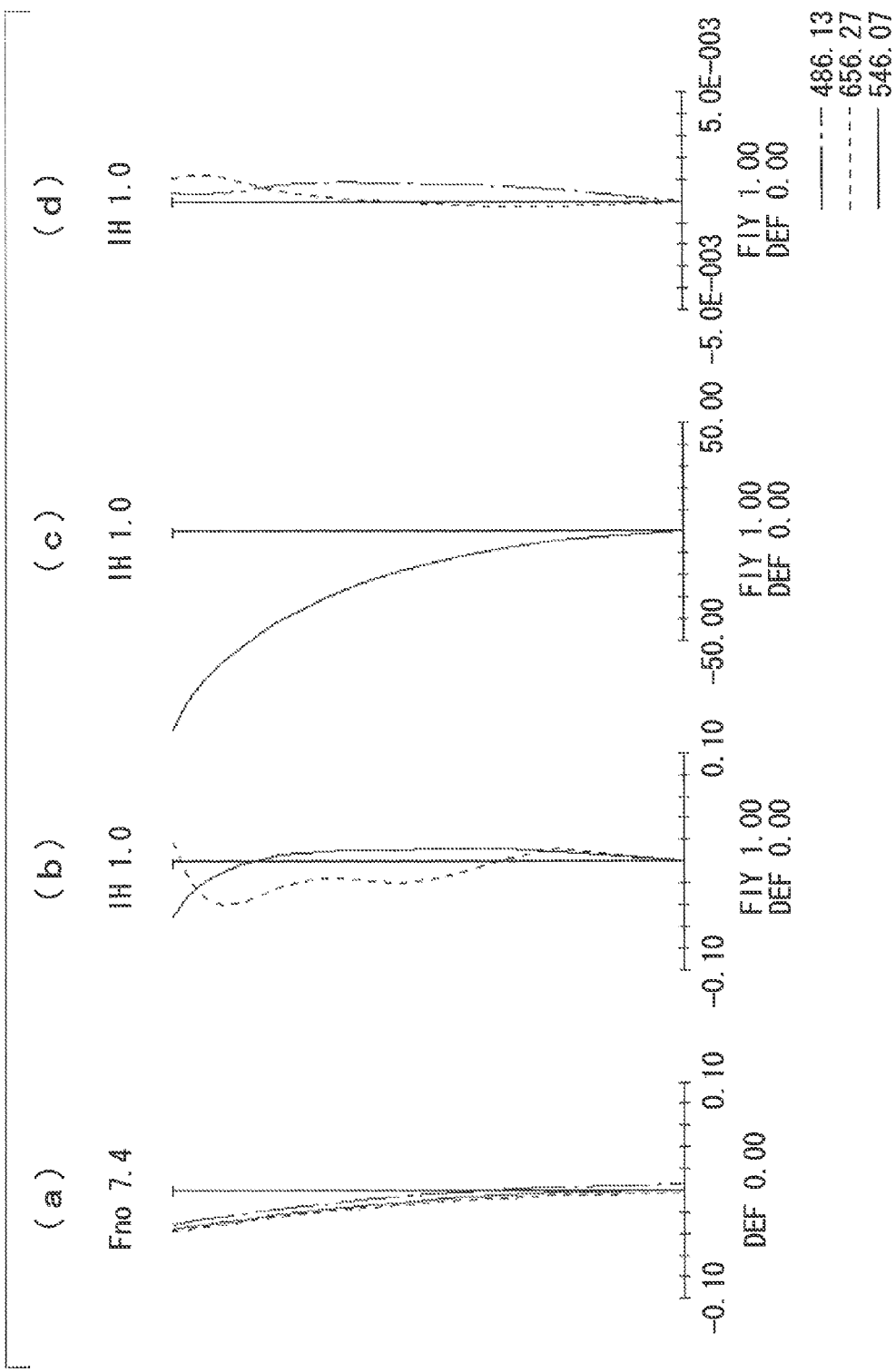
FIG. 7 illustrates aberration diagrams of the objective optical system in FIG. 6.

FIG. 7 illustrates aberration diagrams of the objective optical system according to the third example having the above-described configuration.

Surface Data

| Surface No. | Radius of Curvature | Distance Between Surfaces | Refractive Index | Abbe Number |
|---|---|---|---|---|
| 1 | 7.429 | 0.30 | 1.88815 | 40.8 |
| 2 | Aspherical | 0.68 | | |
| 3 | −6.471 | 1.42 | 1.93429 | 18.9 |
| 4 | −2.903 | 0.59 | 1.77621 | 49.6 |
| 5 | −8.479 | 0.01 | | |
| 6 | Aperture Stop | 0.00 | | |
| 7 | 5.658 | 1.07 | 1.49846 | 81.5 |
| 8 | −1.227 | 0.07 | | |
| 9 | 2.811 | 1.32 | 1.51825 | 64.1 |
| 10 | −1.060 | 0.49 | 1.93429 | 18.9 |
| 11 | −2.800 | 0.12 | | |
| 12 | ∞ | 0.50 | 1.51965 | 75.0 |

-continued

| | | | | |
|---|---|---|---|---|
| 13 | ∞ | 0.91 | | |
| 14 | ∞ | 0.60 | 1.51825 | 64.1 |
| 15 | Image Acquisition Surface | | | |

Aspherical Data
Second Surface r = 0.708 k = 0
A4 = 1.1288 × 10$^{-1}$ A6 = −1.8237 × 10$^0$
A8 = 5.5877 × 10$^0$ A10 = −7.9617 × 10$^0$ Various Data Focal Length: 0.77
Image Height IH: 1.0
Fno.: 7.38
Object-Point Distance: 4.9

Fourth Example

Figure 8:
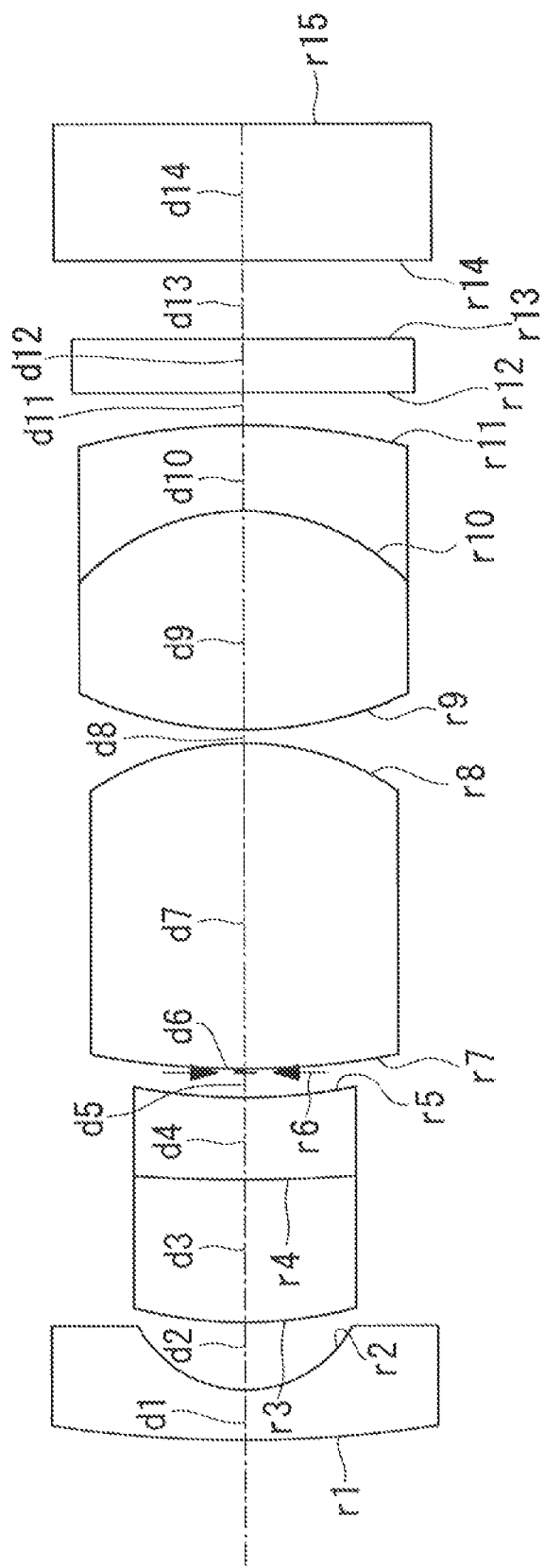
FIG. 8 is a cross-sectional view of an objective optical system according to a fourth example of the present invention.

A cross-sectional view of an objective optical system according to a fourth example is shown in FIG. 8, and surface data and various data thereof are shown below.

The objective optical system according to this example mainly differs from the objective optical system according to the first example in that the front group is constituted of a negative lens and a joined lens, which is formed of a positive lens and a negative lens that are joined together, which are arranged in that order from the object side, and that the object-facing surface of the positive lens is an aspherical surface.

Figure 9:
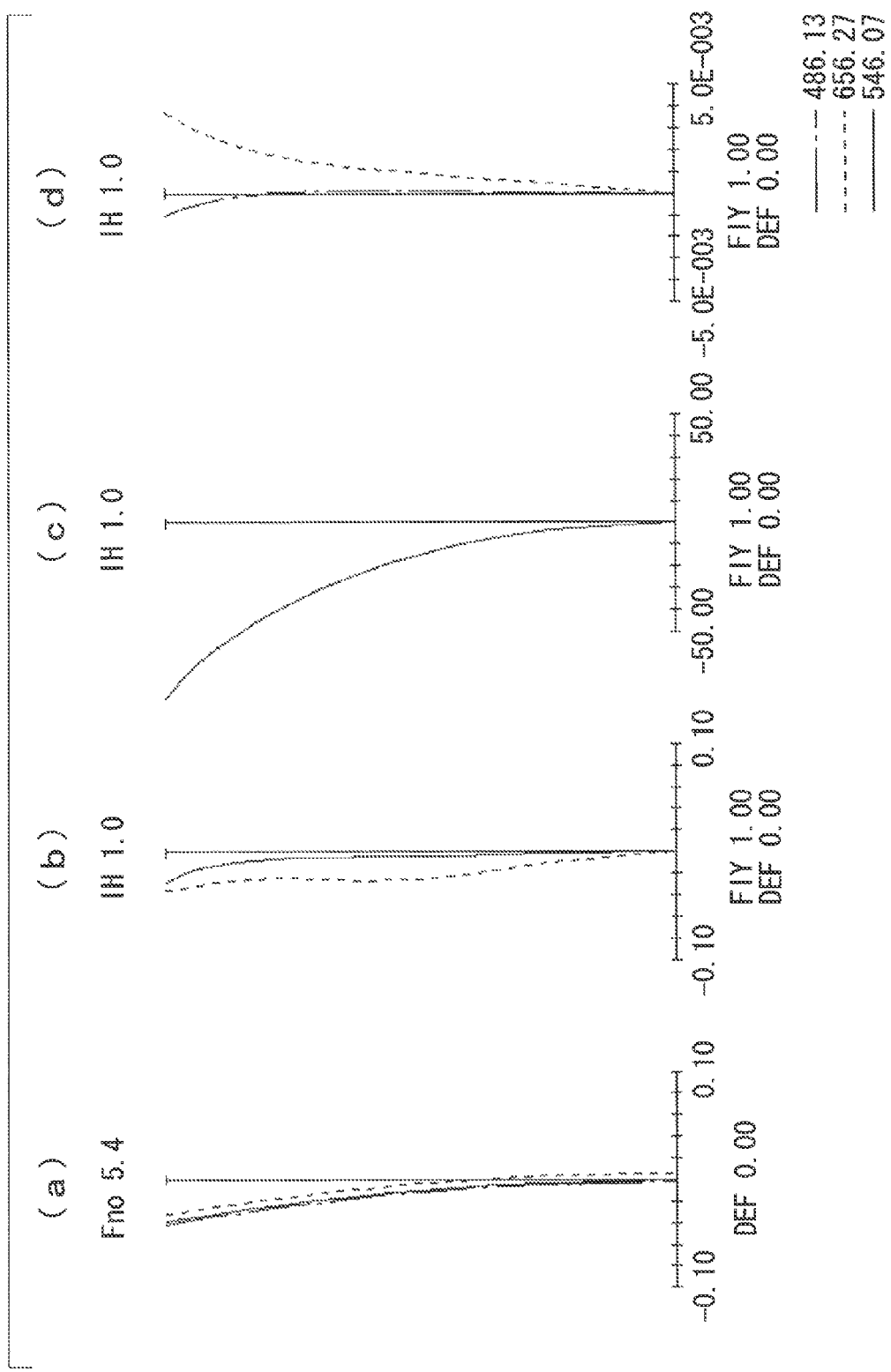
FIG. 9 illustrates aberration diagrams of the objective optical system in FIG. 8.

FIG. 9 illustrates aberration diagrams of the objective optical system according to the fourth example having the above-described configuration.

Surface Data

| Surface No. | Radius of Curvature | Distance Between Surfaces | Refractive Index | Abbe Number |
|---|---|---|---|---|
| 1 | 7.429 | 0.30 | 1.88815 | 40.8 |
| 2 | 0.694 | 0.41 | | |
| 3 | Aspherical | 0.87 | 1.93429 | 18.9 |
| 4 | 26.371 | 0.48 | 1.77621 | 49.6 |
| 5 | 3.900 | 0.14 | | |
| 6 | Aperture Stop | 0.03 | | |
| 7 | 4.913 | 1.94 | 1.77621 | 49.6 |
| 8 | −1.485 | 0.08 | | |
| 9 | 2.215 | 1.32 | 1.51825 | 64.1 |
| 10 | −1.191 | 0.49 | 1.93429 | 18.9 |
| 11 | −3.678 | 0.20 | | |
| 12 | ∞ | 0.30 | 1.51965 | 75.0 |
| 13 | ∞ | 0.47 | | |
| 14 | ∞ | 0.80 | 1.51825 | 64.1 |
| 15 | Image Acquisition Surface | | | |

Aspherical Data
Third Surface r = 5.895 k = 0
A4 = 1.7115 × 10$^{-1}$ A6 = −8.3438 × 10$^{-2}$
A8 = 5.0950 × 10$^{-1}$ -continued Various Data Focal Length: 0.75
Image Height IH: 1.0
Fno.: 5.43
Object-Point Distance: 4.8

Fifth Example

Figure 10:
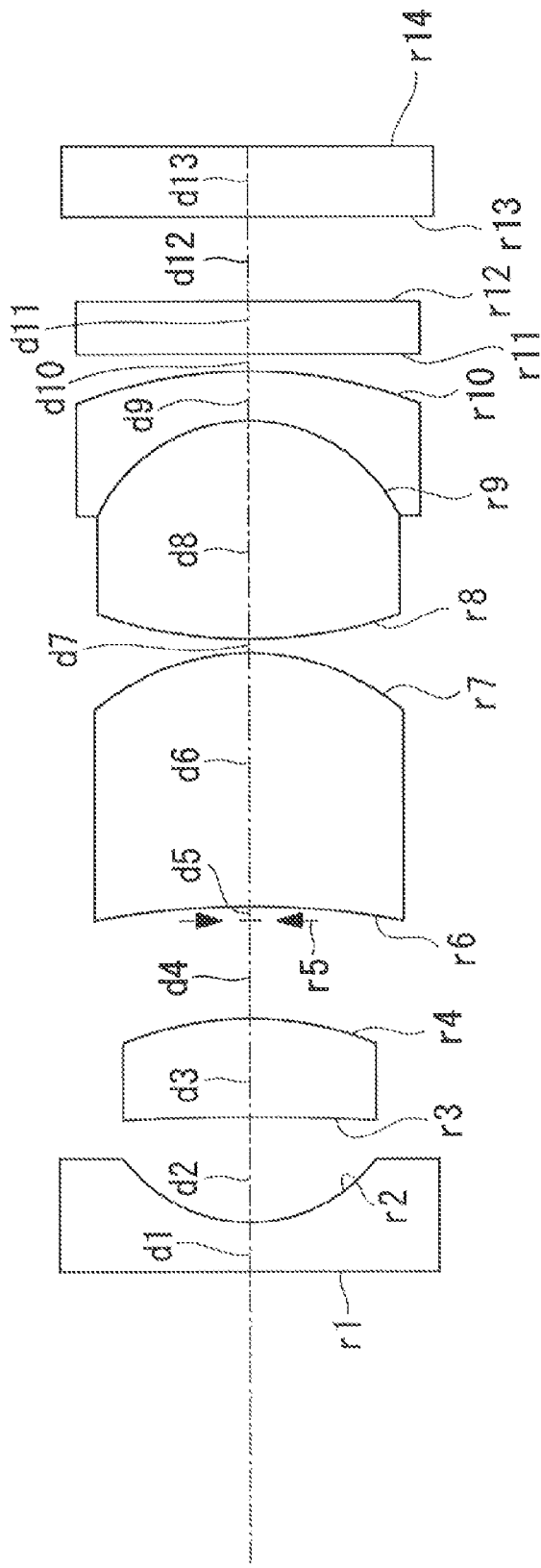
FIG. 10 is a cross-sectional view of an objective optical system according to a fifth example of the present invention.

A cross-sectional view of an objective optical system according to a fifth example is shown in FIG. 10, and surface data and various data thereof are shown below.

The objective optical system according to this example is similar to the objective optical system according to the first example in terms of the basic configuration.

Figure 11:
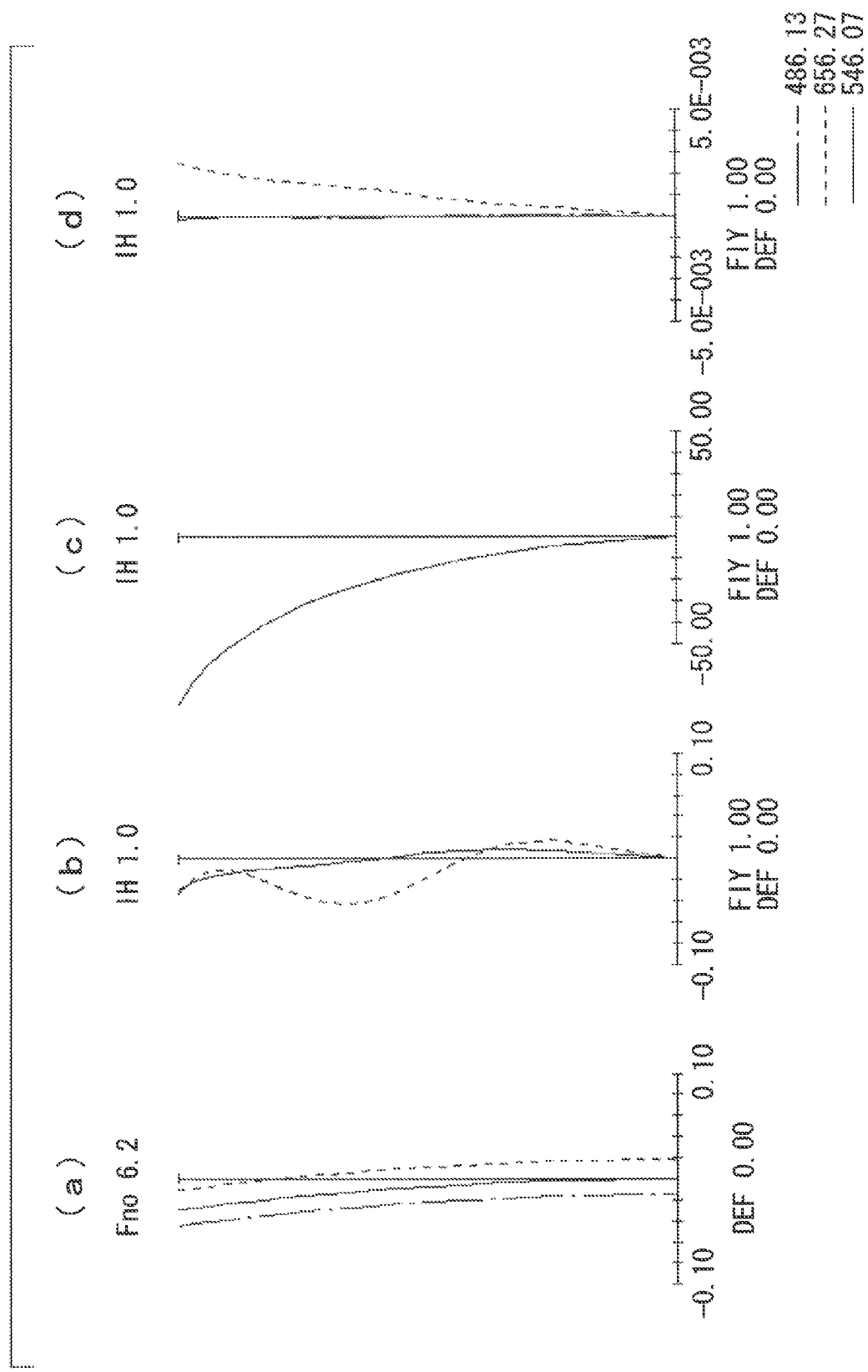
FIG. 11 illustrates aberration diagrams of the objective optical system in FIG. 10.

FIG. 11 illustrates aberration diagrams of the objective optical system according to the fifth example having the above-described configuration.

| Surface No. | Radius of Curvature | Distance Between Surfaces | Refractive Index | Abbe Number |
|---|---|---|---|---|
| 1 | ∞ | 0.30 | 1.88815 | 40.76 |
| 2 | Aspherical | 0.65 | | |
| 3 | −8.042 | 0.60 | 1.85504 | 23.78 |
| 4 | −1.896 | 0.60 | | |
| 5 | Aperture Stop | 0.08 | | |
| 6 | −4.389 | 1.52 | 1.77621 | 49.60 |
| 7 | −1.333 | 0.08 | | |
| 8 | 2.877 | 1.33 | 1.51825 | 64.14 |
| 9 | −0.996 | 0.31 | 1.93429 | 18.90 |
| 10 | −2.697 | 0.10 | | |
| 11 | ∞ | 0.30 | 1.51965 | 75.00 |
| 12 | ∞ | 0.54 | | |
| 13 | ∞ | 0.40 | 1.51825 | 64.14 |
| 14 | Image Acquisition Surface | | | |

Aspherical Data
Second Surface r = 0.884 k = 0
A4 = 1.1703 × 10$^{-1}$ A6 = −1.0710 × 10$^0$
A8 = 2.0414 × 10$^0$ A10 = −1.7486 × 10$^0$ Various Data Focal Length: 0.77
Image Height IH: 1.0
Fno.: 6.18
Object-Point Distance: 5.0

Sixth Example

Figure 12:
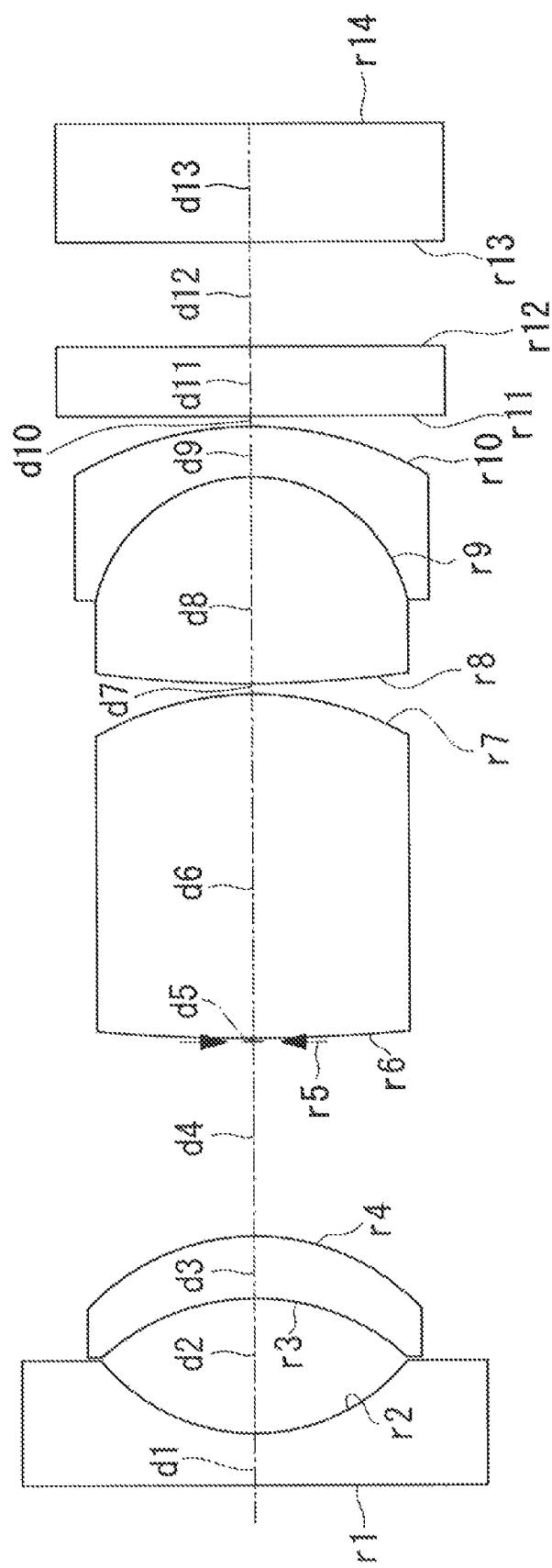
FIG. 12 is a cross-sectional view of an objective optical system according to a sixth example of the present invention.

A cross-sectional view of an objective optical system according to a sixth example is shown in FIG. 12, and surface data and various data thereof are shown below.

The objective optical system according to this example mainly differs from the objective optical system according to the first example in that the image-facing surface of the negative lens and the object-facing surface of the positive lens in the front group are aspherical surfaces.

FIG. 13 illustrates aberration diagrams of the objective optical system according to the sixth example having the above-described configuration.

| | Surface Data | | | |
|---|---|---|---|---|
| Surface No. | Radius of Curvature | Distance Between Surfaces | Refractive Index | Abbe Number |
| 1 | ∞ | 0.30 | 1.88815 | 40.76 |
| 2 | Aspherical | 0.80 | | |
| 3 | Aspherical | 0.39 | 1.85504 | 23.78 |
| 4 | −1.211 | 1.14 | | |
| 5 | Aperture Stop | 0.02 | | |
| 6 | 9.587 | 2.03 | 1.77621 | 49.60 |
| 7 | −1.727 | 0.07 | | |
| 8 | 6.368 | 1.20 | 1.51825 | 64.14 |
| 9 | −0.923 | 0.30 | 1.93429 | 18.90 |
| 10 | −1.903 | 0.08 | | |
| 11 | ∞ | 0.40 | 1.51965 | 75.00 |
| 12 | ∞ | 0.65 | | |
| 13 | ∞ | 0.70 | 1.51825 | 64.14 |
| 14 | Image Acquisition Surface | | | |

Aspherical Data

Second Surface r = 0.952 k = 0
A4 = −6.1558 × $10^{-2}$ A6 = −8.8953 × $10^{-2}$
A8 = 1.7623 × $10^{-1}$ A10 = −4.1465 × $10^{-1}$ Third Surface r = −1.396 k = 0
A4 = −1.7581 × $10^{-2}$ A6 = −8.7816 × $10^{-2}$
A8 = −4.0820 × $10^{-2}$ Various Data Focal Length: 0.73
Image Height IH: 1.0
Fno.: 6.65
Object-Point Distance: 4.8

Table 1 shows numerical values obtained from conditional expressions (1) to (6) for the objective optical systems according to the first to sixth examples.

TABLE 1

| conditional expression | first examples | second examples | third examples | forth examples | Fifth examples | sixth example |
|---|---|---|---|---|---|---|
| (1) | 0.11 | 0.21 | 0.10 | 0.09 | 0.00 | 0.00 |
| (2) | 0.71 | 0.70 | 0.77 | 0.75 | 0.77 | 0.73 |
| (3) | −0.17 | −0.46 | −0.19 | −0.11 | −0.36 | −0.20 |
| (4) | 0.77 | 0.04 | 1.62 | 1.87 | 0.42 | 0.86 |
| (5) | −0.49 | −0.47 | −0.52 | −0.58 | −0.50 | −0.46 |
| (6) | 81.7 | 80.1 | 86.3 | 82.5 | 81.7 | 84.2 |
| (7) | 2.23 | 2.25 | 2.25 | 1.87 | 2.06 | 2.50 |
| (8) | −1.59 | −1.46 | −1.15 | −1.18 | −1.29 | −1.47 |

{Additional Items}

The following aspects are derived from the first to sixth examples.

{Additional Item 1}

An objective optical system having a field angle of 140° or larger and including a front group, an aperture stop, and a positive rear group arranged in that order from an object side, the front group having at least one aspherical surface and including a negative first lens that is disposed closest to the object side and that satisfies the following conditional expression (1):

$$r2/r1 < 0.24 \quad (1)$$

where r1 denotes the radius of curvature of the object side of the first lens disposed closest to the object side in the front group, and r2 denotes the radius of curvature of an image side of the first lens.

{Additional Item 2}

In the objective optical system according to additional item 1, the following conditional expression (2) is satisfied:

$$0.65 < fl/IH < 0.82 \quad (2)$$

where fl denotes the focal length of the entire system, and IH denotes a maximum image height.

{Additional Item 3}

In the objective optical system according to additional item 1, the front group includes the first lens and a positive second lens arranged in that order from the object side.

{Additional Item 4}

In the objective optical system according to additional item 3, the first lens and the second lens satisfy the following conditional expression (3):

$$-0.66 < f1/f2 < -0.06 \quad (3)$$

where f1 denotes the focal length of the first lens, and f2 denotes the focal length of the second lens.

{Additional Item 5}

In the objective optical system according to any one of additional items 1 to 4, the front group is a negative group.

{Additional Item 6}

In the objective optical system according to additional item 2, the following conditional expression (2)' is satisfied:

$$0.68 < fl/IH < 0.78 \quad (2)'$$

{Additional Item 7}

In the objective optical system according to any one of additional items 1 to 4, the following conditional expression (4) is satisfied:

$$0.1 < |g2/g1| < 2.2 \quad (4)$$

where g1 denotes the focal length of the front group, and g2 denotes the focal length of the rear group.

{Additional Item 8}

In the objective optical system according to any one of additional items 1 to 4, the following conditional expression (5) is satisfied:

$$-0.66 < dtl \times 0.01/g2 \times IH < -0.38 \quad (5)$$

where dtl denotes distortion at the maximum image height.

{Additional Item 9}

In the objective optical system according to any one of additional items 1 to 4, the following conditional expression (6) is satisfied:

$$66 < \omega < 88 \quad (6)$$

where ω denotes a half field angle at the maximum image height.

{Additional Item 10}

In the objective optical system according to additional item 9, the following conditional expression (6)' is satisfied:

$$78 < \omega < 88 \quad (6)'$$

{Additional Item 11}

In the objective optical system according to any one of additional items 1 to 4, the following conditional expression (7) is satisfied:

$$1.75 < g2/fl < 2.62 \quad (7)$$

{Additional Item 12}

In the objective optical system according to any one of additional items 1 to 4, the following conditional expression (8) is satisfied:

$$-1.8 < f1/fl < -0.8 \quad (8)$$

The invention claimed is:

1. An objective optical system having a field angle of 140° or larger and comprising a front group, an aperture stop, and a positive rear group arranged in order from an object side, wherein the front group has at least one aspherical surface and includes a negative first lens disposed closest to the object side and satisfying the following conditional expression (1), (4), and (8):

$$0 \leq r2/r1 < 0.24 \quad (1)$$

$$0.1 < |g2/g1| < 2.2 \quad (4)$$

$$-1.8 < f1/fl < -0.8 \quad (8)$$

where r1 denotes a radius of curvature of the object side of the first lens, r2 denotes a radius of curvature of an image side of the first lens, g1 denotes the focal length of the front group, g2 denotes the focal length of the rear group, f1 denotes a focal length of the first lens, and fl denotes the focal length of the entire system.

2. The objective optical system according to claim 1, wherein the following conditional expression (2) is satisfied:

$$0.65 < fl/IH < 0.82 \quad (2)$$

where fl denotes a focal length of the entire system, and IH denotes a maximum image height.

3. The objective optical system according to claim 1, wherein the front group includes the first lens and a positive second lens arranged in order from the object side.

4. The objective optical system according to claim 3, wherein the first lens and the second lens satisfy the following conditional expression (3):

$$-0.66 < f1/f2 < -0.06 \quad (3)$$

where f1 denotes a focal length of the first lens, and f2 denotes a focal length of the second lens.

* * * * *